United States Patent
Gerlach

(10) Patent No.: US 7,617,674 B2
(45) Date of Patent: Nov. 17, 2009

(54) METHOD FOR OPERATING AN EXHAUST-GAS TREATMENT DEVICE OF AN INTERNAL COMBUSTION ENGINE, AND DEVICE FOR CARRYING OUT THE METHOD

(75) Inventor: Michael Gerlach, Waiblingen-Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 584 days.

(21) Appl. No.: 11/255,292

(22) Filed: Oct. 20, 2005

(65) Prior Publication Data

US 2006/0086084 A1    Apr. 27, 2006

(30) Foreign Application Priority Data

Oct. 20, 2004  (DE) .................. 10 2004 050 989

(51) Int. Cl.
*F01N 3/00*   (2006.01)

(52) U.S. Cl. .............................. 60/286; 60/298; 60/301

(58) Field of Classification Search .................. 60/286, 60/289
See application file for complete search history.

(56) References Cited

U.S. PATENT DOCUMENTS

| | | | |
|---|---|---|---|
| 6,209,313 B1* | 4/2001 | Wissler et al. | 60/274 |
| 6,519,935 B2* | 2/2003 | Weigl | 60/286 |
| 6,637,196 B1* | 10/2003 | Tost | 60/286 |
| 2003/0074891 A1* | 4/2003 | Tamura et al. | 60/284 |
| 2003/0167756 A1* | 9/2003 | Szymkowicz | 60/289 |
| 2004/0011027 A1* | 1/2004 | Hirooka et al. | 60/289 |

FOREIGN PATENT DOCUMENTS

DE    101 39 142    2/2003

* cited by examiner

*Primary Examiner*—Melvin C Mayes
*Assistant Examiner*—Melissa Stalder
(74) *Attorney, Agent, or Firm*—Kenyon & Kenyon LLP

(57) ABSTRACT

A method for operating an exhaust-gas treatment device of an internal combustion engine and a device for carrying out the method, in which a reagent, whose pressure is measured by a reagent pressure sensor, is introduced into the exhaust-gas area upstream from the exhaust-gas treatment device. First the reagent pressure is brought to the exhaust-gas pressure which prevails in the exhaust-gas area upstream from the exhaust-gas treatment device. Then the pressure difference between the reagent pressure and the sum of the exhaust-gas pressure and the ambient air pressure is compared to a predefined pressure difference threshold, and if the pressure difference threshold is exceeded an error signal is supplied. The procedure contributes to an exact metering of the reagent through a diagnosis of the reagent pressure sensor.

10 Claims, 2 Drawing Sheets

METHOD FOR OPERATING AN EXHAUST-GAS TREATMENT DEVICE OF AN INTERNAL COMBUSTION ENGINE, AND DEVICE FOR CARRYING OUT THE METHOD

FIELD OF THE INVENTION

The present invention is directed to a method for operating an exhaust-gas treatment device of an internal combustion engine, in which a reagent is introduced into the exhaust-gas area of the internal combustion engine, and to a device for carrying out the method according to the definition of the species in the independent claims.

BACKGROUND INFORMATION

German Patent Application No. DE 101 39 142 contains a description of an exhaust-gas treatment device of an internal combustion engine, in which an SCR (selective catalytic reduction) catalytic converter is employed to reduce the NOx emissions, which reduces the nitrogen oxides contained in the exhaust gas to nitrogen, using ammonia as the reducing agent. The ammonia is obtained from a solution of urea in water in a hydrolysis catalytic converter upstream from the SCR catalytic converter. The hydrolysis catalytic converter converts the urea contained in the aqueous urea solution to ammonia and carbon dioxide. To ensure exact metering, provision is made for determining the concentration of the aqueous urea solution. The aqueous urea solution is brought to a specified pressure using a pump. A metering valve sets a specified rate of flow. Pressurized air is mixed into the aqueous urea solution in a mixing chamber. The aqueous urea solution, together with the added air, is sprayed into the exhaust gas of the internal combustion engine in such a way that a largely uniform flow to the SCR catalytic converter is attained.

German Patent Application No. DE 10 2004 018 221 (not previously published) contains descriptions of a method and a device according to the species, in which a pressurized reagent is also sprayed into the exhaust gas of an internal combustion engine upstream from an SCR catalytic converter. The reagent pressure is set at a prescribed specified reagent pressure, depending on a characteristic value. An operating variable of the internal combustion engine and/or a characteristic of the exhaust gas of the internal combustion engine may be used as the characteristic. The prescribed specified reagent pressure is regulated under a regulation system in which the actual reagent pressure is detected by a reagent pressure sensor. Pressurized air may be added to the reagent. The pressure of the pressurized air may also be regulated under a regulation system to a prescribed specified pressurized air pressure depending on a characteristic, the actual pressure of the pressurized air being detected by a pressurized air pressure sensor. A defect in at least one of the pressure sensors may result in reduced performance of the SCR catalytic converter, with the consequence that uncleaned exhaust gas is able to escape into the environment.

German Patent Application No. DE 10 2004 044 506 (not previously published) also contains descriptions of a method and a device according to the species, in which a pressurized reagent is sprayed into the exhaust gas of an internal combustion engine upstream from an SCR catalytic converter. The pressurized air is routed through a check valve, which has an opening pressure. There is provision for a diagnosis of the pressurized air pressure, which begins at a starting point when a pressurized air regulating valve is closed. At least at a second point in time a check is performed to determine whether the pressurized air pressure corresponds at least to a lower threshold value, which corresponds at least approximately to the sum of the ambient air pressure and the opening pressure of the check valve. An error signal is supplied if the condition is not fulfilled.

An object of the present invention is a method for operating an exhaust-gas treatment system of an internal combustion engine in which a reagent is introduced into the exhaust-gas area of the internal combustion engine, as well as a device for carrying out the method, which contribute to exact metering of the reagent.

SUMMARY OF THE INVENTION

The method according to the present invention for operating an exhaust-gas treatment device, in which a reagent, whose pressure is measured by a reagent pressure sensor, is introduced into the exhaust-gas area upstream from the exhaust-gas treatment device, provides that the reagent pressure is first brought to the exhaust-gas pressure that prevails in the exhaust-gas area upstream from the exhaust-gas treatment device. The pressure difference between the reagent pressure and the sum of the exhaust-gas pressure and the ambient air pressure is then compared to a predefined pressure difference threshold, and if the pressure difference threshold is exceeded an error signal is supplied.

The procedure according to the present invention makes it possible to diagnose the reagent pressure sensor. In particular, it is possible to detect a drift in a signal offset of the reagent pressure sensor which exceeds a predefined measure. The procedure according to the present invention contributes to exact dispensing of the quantity of reagent needed for efficient cleaning of the exhaust gas. Maintaining a prescribed reagent pressure prevents both undesirable overdosage and underdosage of the reagent.

One embodiment provides that a reagent pump, which is present to produce the reagent pressure, be switched off. Another measure for bringing the reagent pressure to the exhaust-gas pressure that prevails in the exhaust-gas area upstream from the exhaust-gas treatment device provides that a metering valve for the reagent be opened.

One embodiment provides for measuring the exhaust-gas pressure using a pressure sensor. Preferably the exhaust-gas pressure is determined from a rotational speed signal of the internal combustion engine and a fuel signal.

One embodiment provides for the comparison to be carried out with a low mass flow of NOx upstream from the exhaust-gas treatment device and/or a light load on the internal combustion engine. This measure involves the least intervention in the exhaust gas cleaning by the exhaust-gas treatment device. The mass flow of NOx and/or the load on the internal combustion engine is preferably determined on the basis of the rotational speed signal of the internal combustion engine and/or the fuel signal.

The device according to the present invention for carrying out the method relates initially to a control unit which is set up to carry out the method.

The control unit includes in particular a diagnosis controller, a characteristics map for determining the exhaust-gas pressure, and a comparer for comparing the pressure difference to the predefined pressure difference threshold. The control unit preferably includes at least one electronic memory, in which the procedural steps are stored as a computer program.

DETAILED DESCRIPTION

Figure 1:
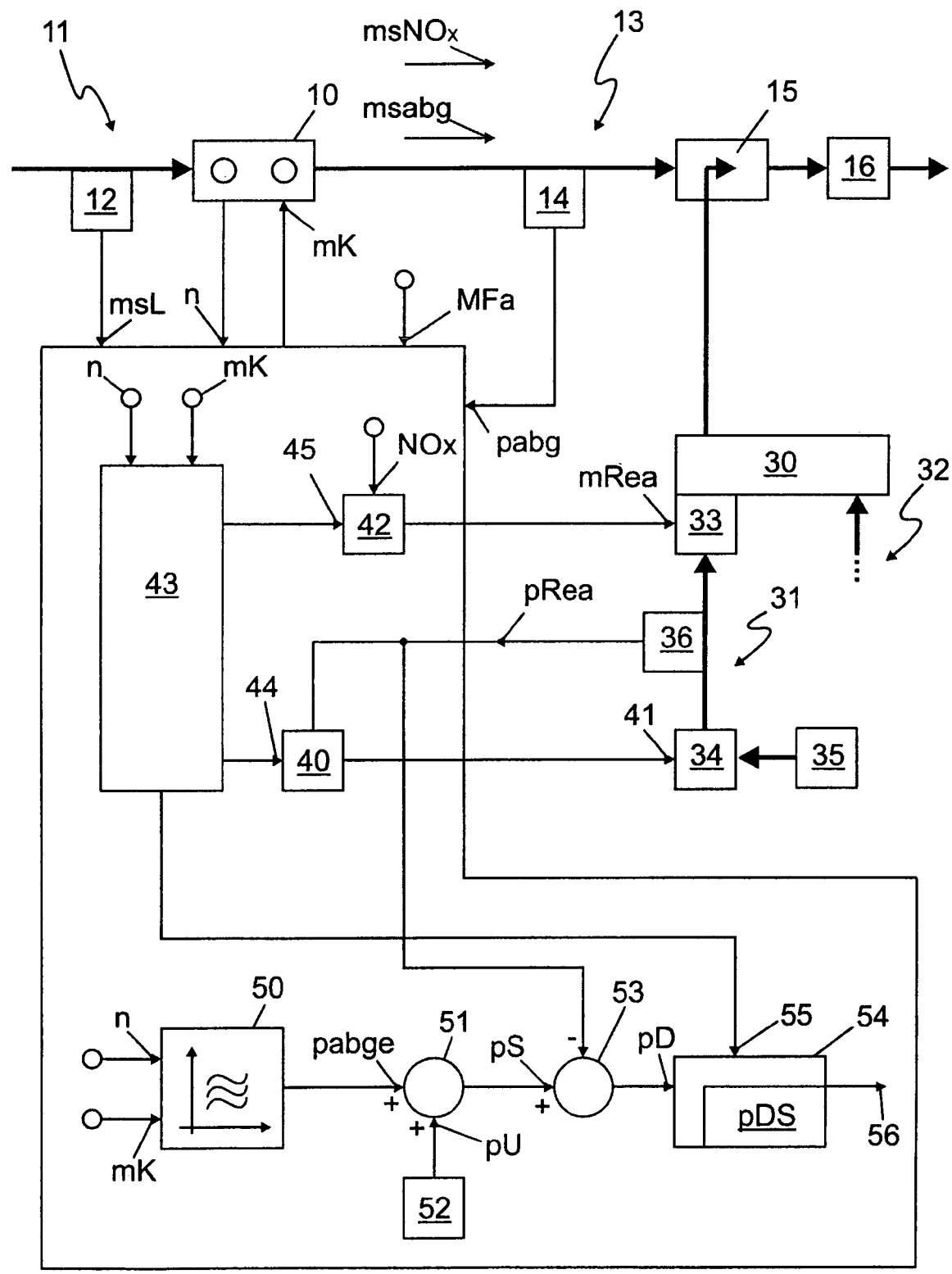
FIG. 1 shows a technical environment in which a method according to the present invention is running.

FIG. 1 shows an internal combustion engine 10, in whose intake area 11 there is an air sensor 12 and in whose exhaust-gas area 13 there are an exhaust-gas pressure sensor 14, a reagent introduction device 15 and an exhaust-gas treatment device 16.

Air sensor 12 delivers an air signal msL to a control unit 20, internal combustion engine 10 delivers a rotational speed signal n and exhaust-gas pressure sensor 14 delivers an exhaust-gas pressure pabg. A specified torque MFa is supplied to control unit 20. Control unit 20 delivers a fuel signal mK to internal combustion engine 10.

Upstream from exhaust-gas treatment device 16, an NOx mass flow msNOx and an exhaust-gas mass flow msabg occur.

Reagent introduction device 15 is connected to a mixing chamber 30, which connects a reagent path 31 and a pressurized air path 32 with each other. Reagent path 31 contains a metering valve 33, which is connected to a reagent pump 34 that draws a reagent from a reagent tank 35. The reagent pressure is detected by a reagent pressure sensor 36, which provides reagent pressure signal pRea to control unit 20.

Control unit 20 includes a reagent pump actuating signal determining device 40, which applies a reagent pump actuating signal 41 to reagent pump 34. Reagent pressure signal pRea is supplied to reagent pump actuating signal determining device 40.

Control unit 20 also includes a metering valve actuating signal determining device 42, which applies a metering valve actuating signal mRea to metering valve 33. An NOx signal NOx is supplied to metering valve actuating signal determining device 42.

A diagnosis controller 43 actuates reagent pump actuating signal determining device 40 with a first switching signal 44, and metering valve actuating signal determining device 42 with a second switching signal 45. Rotational speed signal n and fuel signal mK are fed to diagnosis controller 43. Both signals are also supplied to a characteristics map 50.

Characteristics map 50 forwards a calculated exhaust-gas pressure pabge to a first adder 51, which adds calculated exhaust-gas pressure pabge to an ambient air pressure pU measured by an ambient air pressure sensor 52 and forwards total pressure pS to a second adder 53.

Second adder 53 forms a pressure difference pD from total pressure pS and reagent pressure signal pRea. Pressure difference pD is compared to a pressure difference threshold pDS in a comparer 54, depending on an enabling signal 55. As a function of the comparison result comparer 54 issues an error signal 56.

Figure 2:
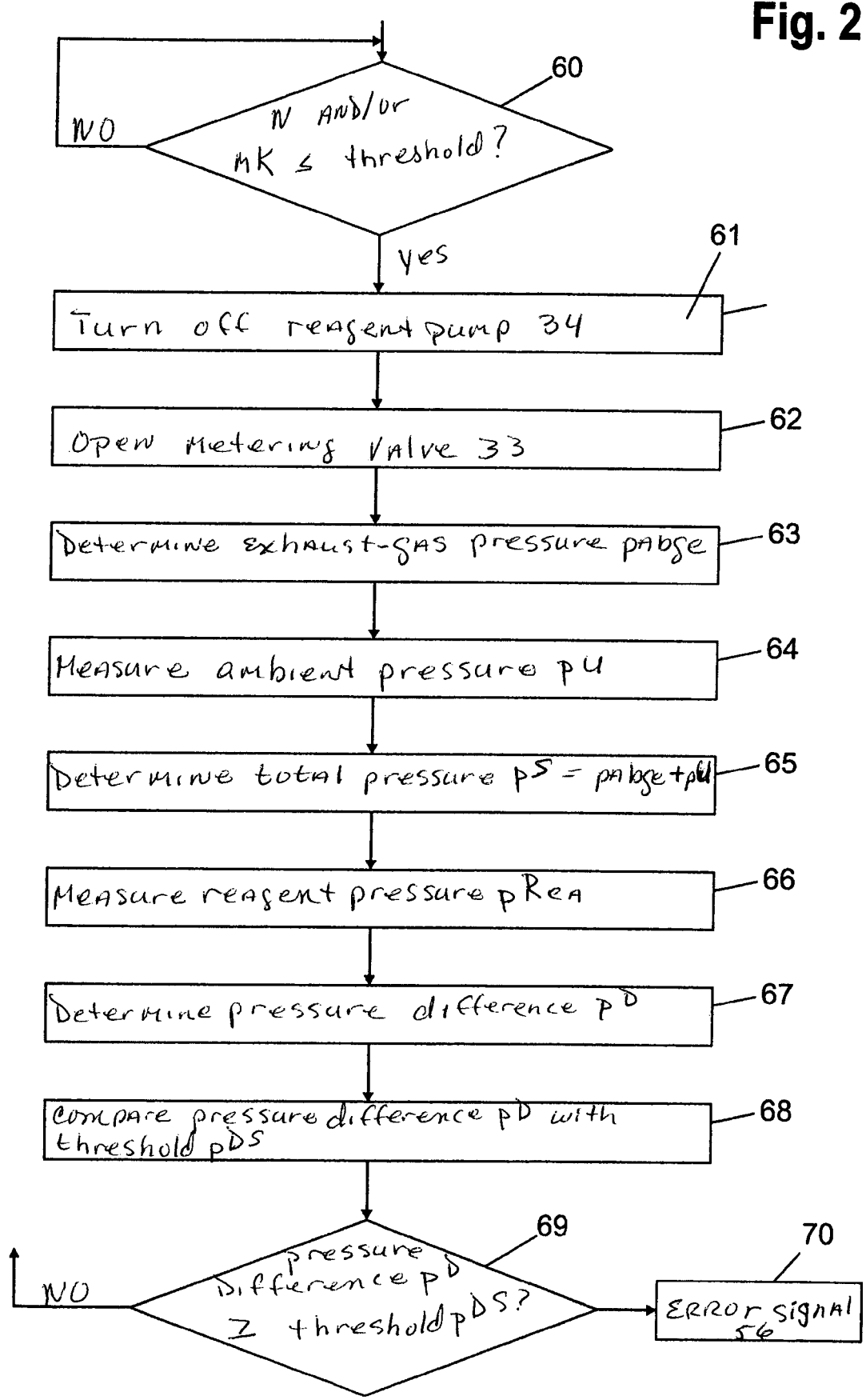
FIG. 2 shows a flow chart of a method according to the present invention.

The flow chart shown in FIG. 2 contains in a first query 60 a check of whether rotational speed signal n and fuel signal mK are lower than or equal to predefined thresholds. If not, the procedure jumps back. If so, reagent pump 34 is switched off in a first function block 61. In a second function block 62, metering valve 33 is opened. In a third function block 62, exhaust-gas pressure pabge is calculated. In a fourth function block 64, ambient air pressure pU is measured. In a fifth function block 65, the sum pS of calculated exhaust-gas pressure pabge and ambient air pressure pU is determined. In a sixth function block 66, reagent pressure pRea is measured. In a seventh function block 67, pressure difference pD is determined, and in an eighth function block 68 pressure difference pD is compared to pressure difference threshold pDS. A second query 69 determines whether pressure difference pD is greater than or equal to pressure difference threshold pDS. If not, the procedure jumps back. If so, error signal 56 is supplied according to a ninth function block 70.

The method according to the present invention works as follows:

Control unit 20 determines fuel signal mK, depending on at least one input signal. In particular specified torque MFa, derived from the position of an accelerator pedal (not shown in greater detail) in a motor vehicle, is provided as the input signal. If appropriate, air signal msL supplied by air sensor 12, and/or fuel signal mK supplied by internal combustion engine 10, are also taken into account.

Exhaust-gas mass flow msabg, which contains NOx mass flow msNOx, is cleansed of at least one exhaust-gas component by exhaust-gas treatment device 16. To perform the cleaning task, exhaust-gas treatment device 16 requires a reagent, which is stored in reagent tank 35. Exhaust-gas treatment device 16 preferably contains an SCR catalytic converter, which converts the nitrogen oxides contained in the exhaust gas to hydrogen and nitrogen, using ammonia, for example, as the reagent. The reagent is sprayed into exhaust-gas area 13 upstream from exhaust-gas treatment device 16 by reagent introduction device 15.

The reagent is brought to a predefined specified reagent pressure by reagent pump 34, and is fed through metering valve 33 to mixing chamber 30. In mixing chamber 30 the reagent may be mixed with the pressurized air supplied from pressurized air path 32. If there is no pressurized air path 32, mixing chamber 30 is omitted. Metering valve 33, which is positioned on mixing chamber 30 according to the exemplary embodiment shown, may be located directly in exhaust-gas area 13, possibly including mixing chamber 30, and thus may be identical to reagent introduction device 15.

After internal combustion engine 10 is started, the reagent is brought to a predefined pressure of, for example, 4 bar, using reagent pump actuating signal 41. The reagent pressure is measured by reagent pressure sensor 36, and is fed to both reagent pump actuating signal determining device 40 and to second adder 53 as reagent pressure signal pRea.

The quantity of reagent is defined by metering valve actuating signal determining device 42, depending for example on NOx signal NOx, and is fed to metering valve 33 as metering valve actuating signal mRea. NOx signal NOx may be supplied for example by at least one NOx sensor, which may be positioned upstream and/or downstream from exhaust-gas treatment device 16. NOx signal NOx is then at least one measure of NOx mass flow msNOx upstream from exhaust-gas treatment device 16 or of the NOx mass flow downstream from the latter. NOx signal NOx may also be calculated, for example, from operating variables of internal combustion engine 10, for example the load, corresponding to fuel signal mK, and rotational speed signal n. Air signal msL and/or an exhaust-gas recirculation signal (not shown) and/or a boost pressure signal (also not shown) of a turbocharger or compressor may possibly also be taken into account. If internal combustion engine 10 uses spark ignition, the instant of ignition may also be taken into account.

The reagent pressure has an influence on the effectiveness of the exhaust-gas treatment, since the reagent pressure influences both the metered quantity of reagent and the spatial distribution of the reagent in exhaust-gas area 13 upstream from exhaust-gas treatment device 16. (Spatial) over-apportionment may result in a break-through of the reagent. (Spatial) under-apportionment results in exhaust-gas treatment device 16 no longer being able to completely fulfill the cleaning function.

Therefore provision is made for diagnosis of reagent pressure signal pRea supplied by reagent pressure sensor 36, which begins, for example, according to the flow chart shown in FIG. 2 with first query 60, which provides a check of whether rotational speed signal n and/or fuel signal mK exceed predefined threshold values. In first query 60 a general check of whether the load on internal combustion engine 10 is light is performed. A small exhaust-gas mass flow msabg is associated with a light load. If the load is light, generally only a small NOx mass flow msNOx occurs. In addition or alternatively, first query 60 may therefore check whether NOx mass flow msNOx is small. Both exhaust-gas mass flow msabg and NOx mass flow msNOx depend on an operating variable of internal combustion engine 10, such as rotational speed signal n and/or fuel signal mK. If appropriate, when determining the load and/or NOx mass flow msNOx of internal combustion engine 10, air signal msL supplied by air sensor 12 and additional variables, not shown in greater detail, may also be taken into account.

First query 60 represents a filter so that enabling signal 55 is only delivered to comparer 54 if, based on rotational speed signal n and/or fuel signal mK, a suitable state of the internal combustion engine is detected in diagnosis controller 43, in which exhaust-gas treatment device 16 is called upon only in small measure. It is possible to perform the diagnosis without a significant intervention in the exhaust-gas treatment.

To perform the diagnosis, the reagent pressure is brought to exhaust-gas pressure pabg which prevails in exhaust-gas area 13 upstream from exhaust-gas treatment device 16. First function block 61 provides for reagent pump 34 to first be shut off. The shutoff may be triggered by diagnosis controller 43 by supplying first switching signal 44, which is fed to reagent pump actuating signal determining device 40.

According to second function block 62, metering valve 33 is opened. The opening may be triggered by diagnosis controller 43 by supplying second switching signal 45, which is fed to metering valve actuating signal determining device 42.

Both measures contribute, through a connection to exhaust-gas area 13 upstream from exhaust-gas treatment device 16, to making the reagent pressure that prevails in reagent path 31 at least approximately equal to exhaust-gas pressure pabg that is present in exhaust-gas area 13.

Exhaust-gas pressure pabg is measured, for example, by exhaust-gas pressure sensor 14 and is supplied to control unit 20. According to an advantageous embodiment, characteristics map 50 is provided, which makes rotational speed signal n and fuel signal mK, for example, the basis for calculating exhaust-gas pressure pabge. Exhaust-gas pressure sensor 14 may then be dispensed with.

Performing the diagnosis also requires ambient air pressure pU, which is preferably measured by ambient air pressure sensor 52. The ambient air pressure sensor is contained either directly in control unit 20 or in a different control unit.

First adder 51 determines total pressure pS from calculated exhaust-gas pressure pabge and ambient air pressure pU by addition. Reagent pressure pRea, which is to be measured according to sixth function block 66, is generally constantly available. Second adder 53 is therefore able to constantly determine pressure difference pD between reagent pressure pRea and total pressure pS according to seventh function block 67.

Only examples are given of the sequence of individual procedural steps according to first through sixth function blocks 61-66.

Comparer 54 compares pressure difference pD to pressure difference threshold pDS, and if a threshold is exceeded it supplies error signal 56, which may, for example, be displayed and/or stored in an error memory. If no threshold overrun occurs, the procedure is ended or jumps back.

Occurrence of an error signal 56 signals that an unacceptably high signal offset of reagent pressure sensor 36 has occurred. Reagent pressure sensor 36 must then be replaced. Until error signal 56 appears, pressure difference pD may be used to correct the signal offset of reagent pressure sensor 36.

What is claimed is:

1. A method for operating an exhaust-gas treatment device of an internal combustion engine, comprising:
    introducing a reagent, whose pressure is measured by a reagent pressure sensor, into an exhaust-gas area upstream from the exhaust-gas treatment device;
    bringing a reagent pressure to an exhaust-gas pressure that prevails in the exhaust-gas area upstream from the exhaust-gas treatment device;
    comparing a pressure difference between the reagent pressure and a sum of the exhaust-gas pressure and an ambient air pressure to a predefined pressure difference threshold; and
    if the pressure difference threshold is exceeded, supplying an error signal.

2. The method according to claim 1, further comprising switching off a reagent pump provided to produce the reagent pressure.

3. The method according to claim 1, further comprising opening a metering valve for the reagent.

4. The method according to claim 1, further comprising one of measuring the exhaust-gas pressure and determining the exhaust-gas pressure from at least one operating variable of the internal combustion engine.

5. The method according to claim 4, wherein the exhaust-gas pressure is determined from a rotational speed signal of the internal combustion engine and a fuel signal.

6. The method according to claim 1, further comprising measuring the ambient air pressure.

7. The method according to claim 1, wherein the comparison is carried out with at least one of (a) a low NOx mass flow upstream from the exhaust-gas treatment device and (b) a light load on the internal combustion engine.

8. The method according to claim 7, further comprising determining at least one of the NOx mass flow and the load on the internal combustion engine on the basis of at least one of a rotational speed signal of the internal combustion engine and a fuel signal.

9. The method according to claim 1, wherein:
    a reagent pump is switched off to produce the reagent pressure,
    a metering valve is opened for the reagent,
    the exhaust-gas pressure is measured or the exhaust-gas pressure is determined from at least one operating variable of the internal combustion engine,
    the exhaust-gas pressure is determined from a rotational speed signal of the internal combustion engine and a fuel signal,
    the ambient air pressure is measured.

10. The method according to claim 9, wherein the comparison is carried out with at least one of (a) a low NOx mass flow upstream from the exhaust-gas treatment device and (b) a light load on the internal combustion engine, and wherein at least one of the NOx mass flow and the load on the internal combustion engine is determined on the basis of at least one of a rotational speed signal of the internal combustion engine and a fuel signal.

* * * * *

UNITED STATES PATENT AND TRADEMARK OFFICE
CERTIFICATE OF CORRECTION

PATENT NO. : 7,617,674 B2 Page 1 of 1
APPLICATION NO. : 11/255292
DATED : November 17, 2009
INVENTOR(S) : Michael Gerlach It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this

Nineteenth Day of October, 2010

David J. Kappos
*Director of the United States Patent and Trademark Office*